A. J. KARL AND B. F. WEBB.
TRANSMISSION GEARING.
APPLICATION FILED FEB. 28, 1919.
1,345,494.
Patented July 6, 1920.
2 SHEETS—SHEET 2.
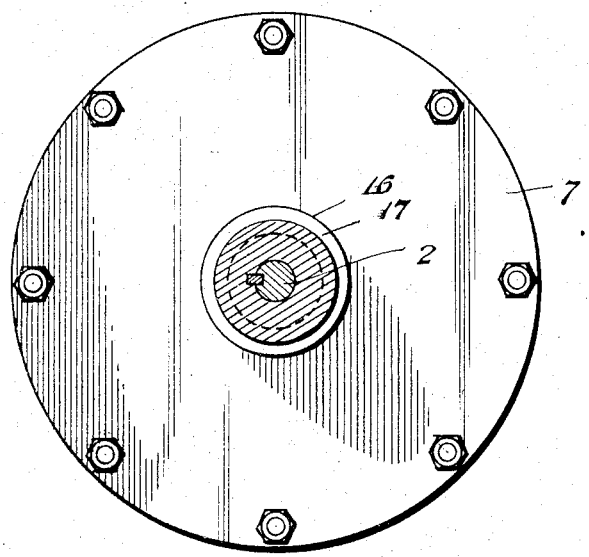
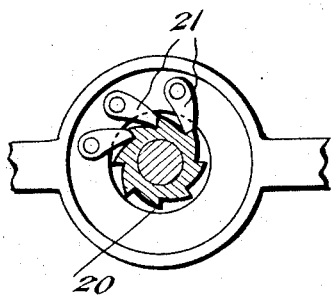
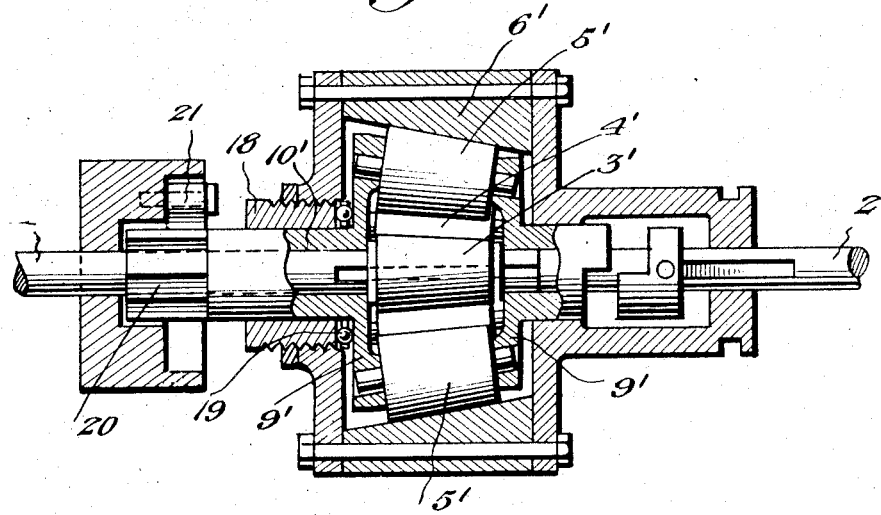
WITNESSES
INVENTORS
Andrew J. Karl
Benjamin F. Webb
ATTORNEY

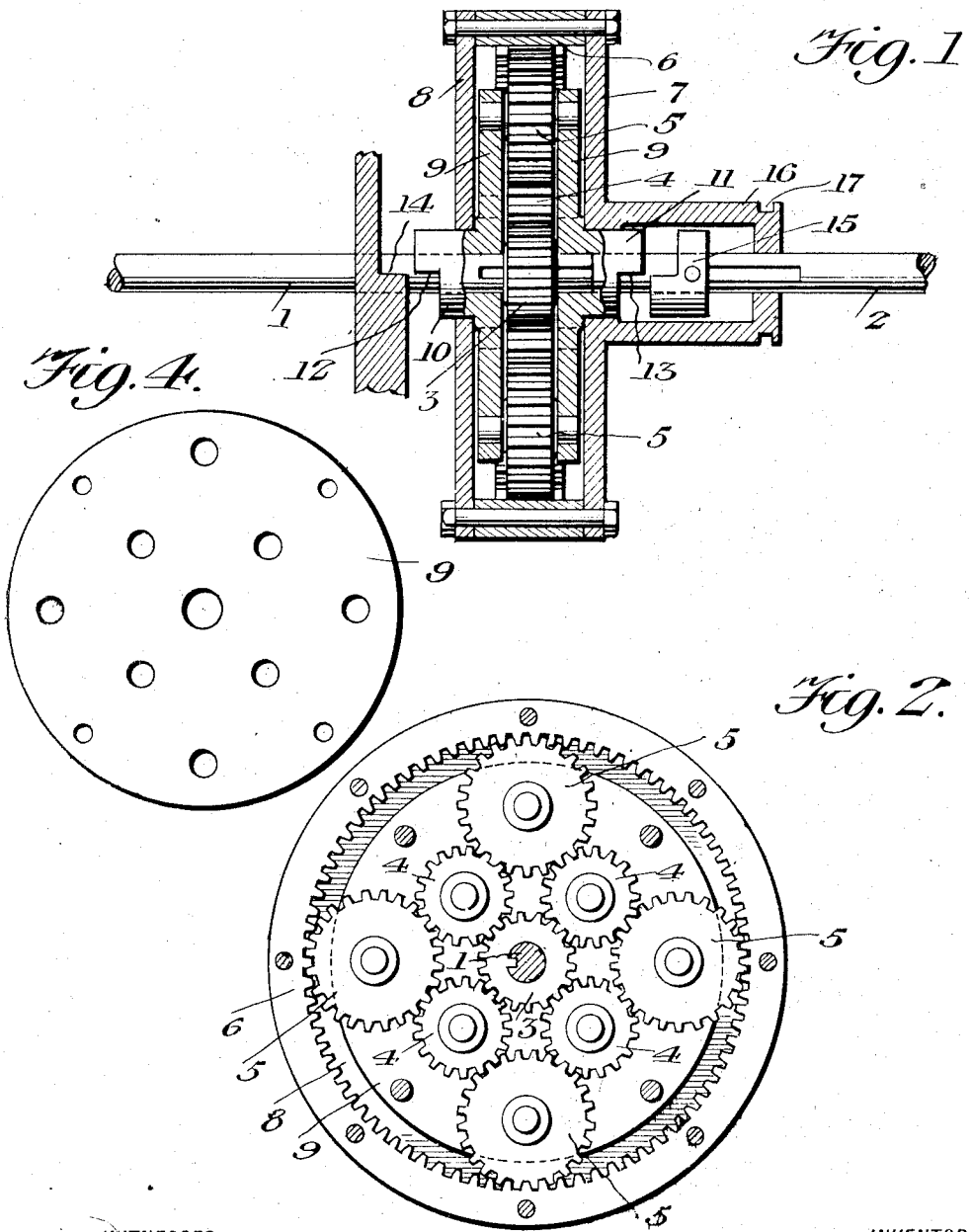

UNITED STATES PATENT OFFICE.

ANDREW J. KARL AND BENJAMIN FRANKLIN WEBB, OF SISTERSVILLE, WEST VIRGINIA.

TRANSMISSION-GEARING.

1,345,494.

Specification of Letters Patent.

Patented July 6, 1920.

Application filed February 28, 1919. Serial No. 279,688.

*To all whom it may concern:*

Be it known, that we, ANDREW J. KARL and BENJAMIN F. WEBB, citizens of the United States, residing at Sistersville, in the county of Tyler and State of West Virginia, have invented new and useful Improvements in Transmission-Gearing, of which the following is a specification.

This invention relates to transmission gearing of the planetary variable speed type, the object in view being to provide simple means whereby a rotary driven shaft may be arranged end to end with a rotary driving shaft and receive motion therefrom at different ratios of speed under the control of the operator the gearing being well adapted for motor vehicle practice to change the ratio of speed between the engine shaft and the driving shaft or axle of the vehicle.

With these and other objects in view, the invention consists in the novel construction, combination and arrangement of parts herein fully described, illustrated and claimed.

In the accompanying drawings:—

Figure 1 is a view partly in side elevation and partly in section of the improved transmission gearing.

Fig. 2 is a vertical transverse section through the same in line with the planetary gears.

Fig. 3 is a transverse section through the hub extension.

Fig. 4 is an inside face view of one of the carrier disks.

Fig. 5 is a longitudinal section similar to Fig. 1 showing another form of gearing embodying however the same principle.

Fig. 6 is a sectional view showing the pawl and ratchet mechanism.

By means of the construction herein shown and described, it is practicable to arrange the driving and driven shafts end to end or in longitudinal alinement with each other. Referring to the drawings 1 designates the driving shaft and 2 the driven shaft, the adjacent ends of said shafts being shown arranged in abutting relation within the gearing by means of which rotary motion is transmitted from the driving shaft to the driven shaft at different ratios of speed.

In order to transmit motion from the driving shaft 1 to the driven shaft 2, we mount a central gear 3 fast on the end portion of the driving shaft 1 adjacent to the end of the driven shaft 2. The central gear 3 meshes with and drives a circular series of pinions 4 arranged around said central gear 3, and the pinions 4 in turn mesh with other gears 5 arranged in a circular series as shown in Fig. 2 and meshing with the teeth of an internal ring gear 6 which is clamped or bolted as shown between a pair of frame plates or housing plates 7 and 8 as shown in Fig. 1. The housing member 7 is splined onto the shaft 2 as shown at $7^a$. The internal gear 6 and the housing plates 7 and 8 form one part of the mechanism and are normally spaced for rotating movement about the shaft 1.

The planetary pinions 5 and 4 and the central pinion 3 are mounted between a pair of disk shaped members or plates 9 which form the planetary pinion carrier, said carrier being formed with bearing openings to receive the journals of the pinions as shown. The carrier members 9 are arranged in spaced relation to each other so as to admit the pinions between them and are confined between the side plates or frame pieces 7 and 8 of the internal gear structure, sufficient clearance however being left for a relative free rotative movement between the pinion carrier and the plates or members. 7 and 8. The pinion carrier is provided with oppositely extending hub portions 10 and 11 provided with clutch faces 12 and 13 respectively. The clutch face 12 is adapted to engage a stationary or non rotary clutch face 14, while the clutch face 13 is adapted to engage a clutch collar 15 fast upon the driven shaft 2 as shown. The housing plate 7 is formed with a tubular hub or extension 16 which incloses the clutch collar 15 and the hub 11 above referred to and is formed externally with an annular groove 17 to receive a shifting fork or lever not shown, by means of which the entire gear mechanism above described is shifted longitudinally of the axes of the shafts 1 and 2 for the purpose of throwing the mechanism into and out of engagement for transmitting motion from one shaft to the other and for varying the ratio of speed between the driving and driven shafts.

In lieu of spur gearing as shown in Figs. 1 and 2, friction gearing may be used as shown in Fig. 5. In such modification the gears 3', 4', 5' and 6' are frusto-conical and the planetary gears are shifted into and out of driving contact with the internal gear 6' by moving the housing which carries said gear 6' in the manner above described. The hub 9' of the pinion carrier is slidable through a bushing 18 in one plate 10' a ball bearing 19 being placed between the carrier 9' and said bushing as shown in Fig. 5. The hub 9' has ratchet teeth 20 engaged by one or more pawls 21 to allow it to turn in one direction while preventing it from turning in the opposite direction. Only a very slight shifting movement of the housing is required to throw the transmission into and out of operation.

What we claim is:—

In combination with the driving and driven shafts arranged in end to end relation, a pinion carrier formed as a pair of disks secured in spaced relation and having planetary pinions journaled therebetween, said pinion carrier being freely revoluble and slidable upon said shafts at their meeting ends, hub portions formed on said disks and cut away to provide clutch members, a casing surrounding said pinion carrier and slidable therewith with respect to the shafts, an extension on said casing splined upon the driven shaft and formed for engagement by a shifting lever, a center gear confined between said disks and meshing with the planetary gears and splined upon the driving shaft, a ring gear on the inner periphery of said casing meshing with said planetary gears, a clutch member secured upon the driven shaft and engageable by the clutch member on the hub at one side of the pinion carrier when said casing and pinion carrier are shifted in one direction, and a stationary member engageable by the clutch members on the hub at the other side of the pinion carrier when the casing and pinion carrier are shifted in the other direction.

In testimony whereof we affix our signatures.

ANDREW J. KARL.
BENJAMIN FRANKLIN WEBB.